March 1, 1949.

M. P. ZIMICKI 2,463,232

TRACTOR-MOUNTED, TIMBER-CUTTING, AXIALLY
ADJUSTABLE, POWER DRIVEN SAW

Filed Oct. 6, 1944

Inventor

MARCHE P. ZIMICKI,

By Clarence A. O'Brien
and Harvey B. Jacobson
Attorneys

March 1, 1949.

M. P. ZIMICKI 2,463,232

TRACTOR-MOUNTED, TIMBER-CUTTING, AXIALLY ADJUSTABLE, POWER DRIVEN SAW

Filed Oct. 6, 1944

Inventor

MARCHE P. ZIMICKI,

By Clarence A. O'Brien
and Harvey B. Jacobson
Attorneys

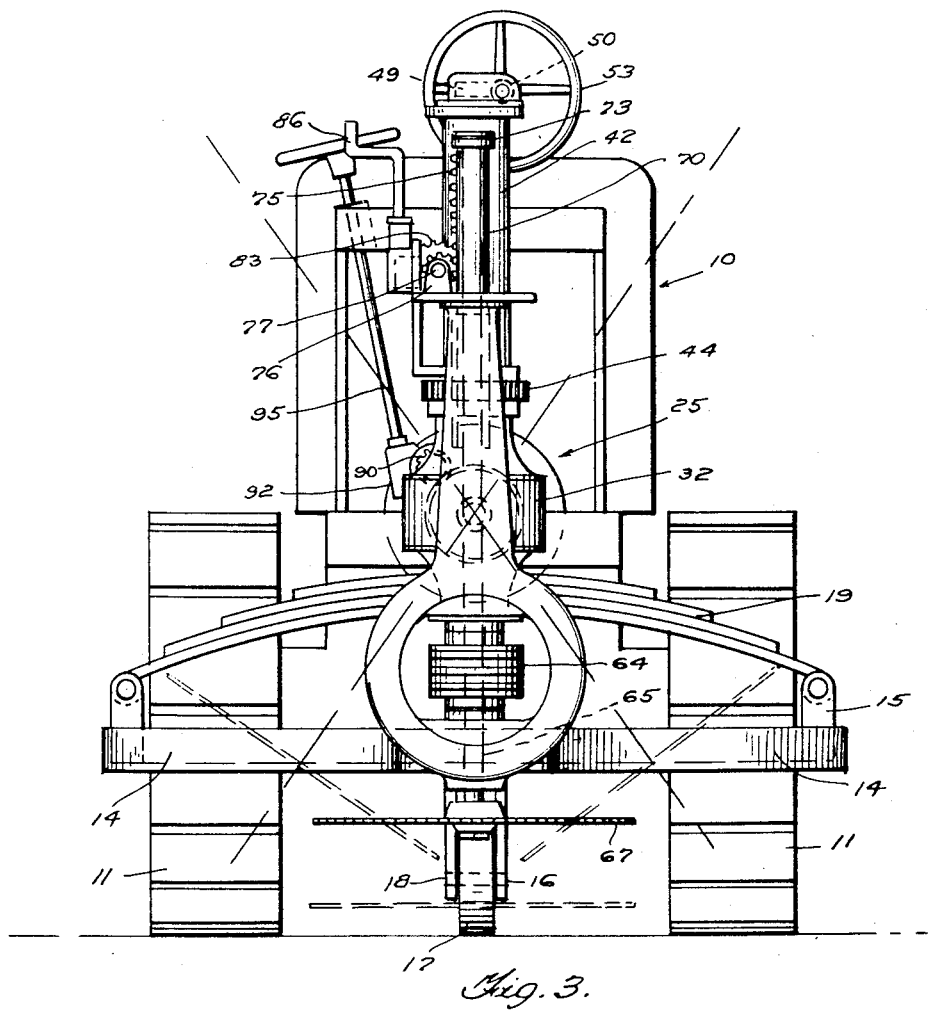

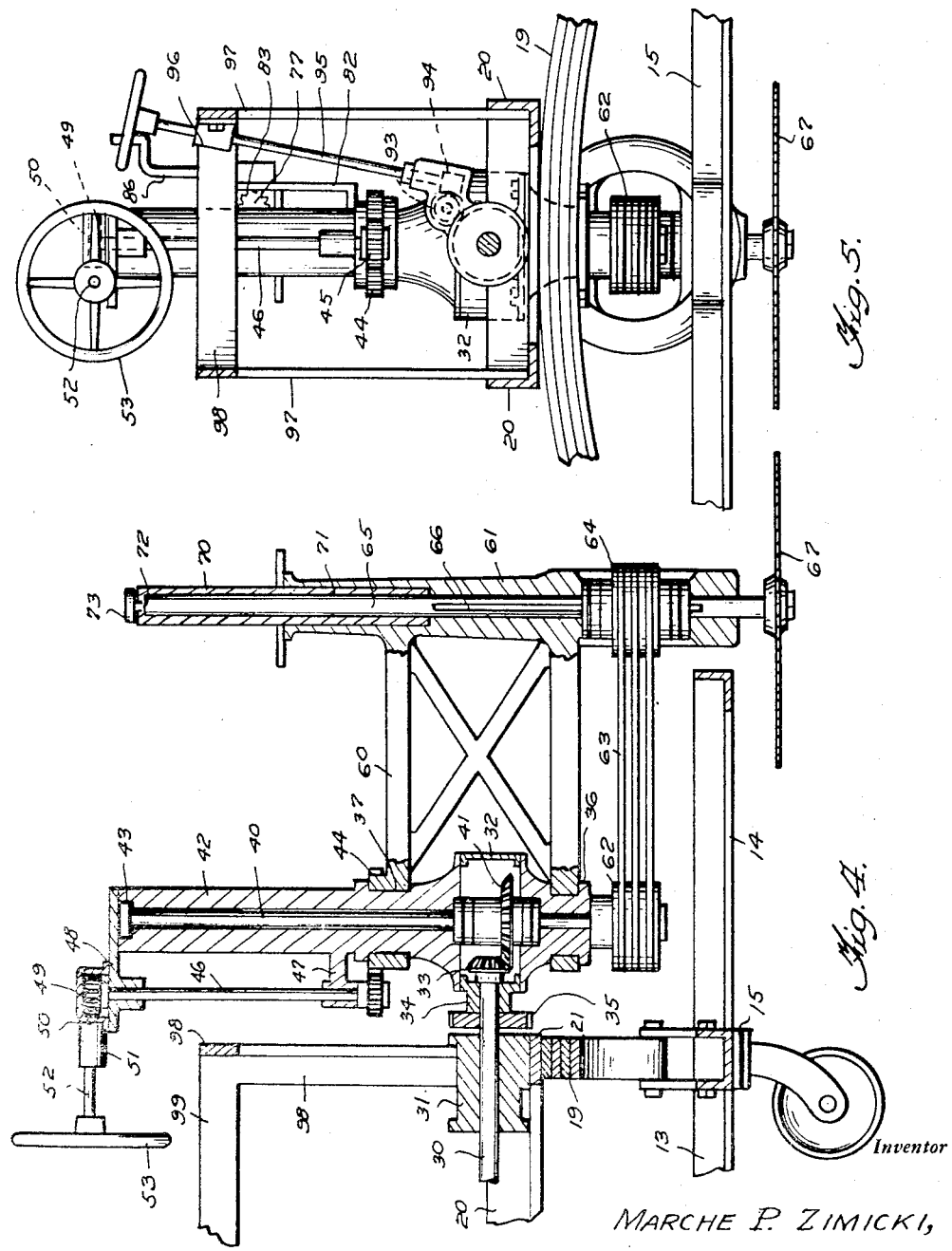

Patented Mar. 1, 1949

2,463,232

UNITED STATES PATENT OFFICE 2,463,232

TRACTOR-MOUNTED, TIMBER-CUTTING, AXIALLY ADJUSTABLE, POWER-DRIVEN SAW

Marche P. Ziricki, Strawn, Tex.

Application October 6, 1944, Serial No. 557,437

1 Claim. (Cl. 143—43)

This invention relates to a power driven saw, and more particularly to such a saw adapted to be attached to a tractor or the like for ready movement to desired positions for use.

A primary object of this invention is the provision of an improved power driven saw adapted for the removal and cutting of trees and brush or the like.

An additional object of this invention is the provision of such a saw wherein the angle of the blade with respect to the ground may be varied through any angle from horizontal to vertical.

Still another object is the provision of such a saw wherein the relative positions of the blade with respect to the tractor may be varied through a material arc, in order that closely spaced trees or the like may be cut without the necessity for moving the tractor per se.

Still another object is the provision of means in such a device whereby the height of the blade relative to the ground may be readily varied.

Still another object resides in the provision of such a power driven saw accomplishing the objects above enumerated, which will be sturdy and durable in construction, reliable and efficient in operation, and relatively simple and inexpensive to manufacture and install.

Other objects reside in the combinations of elements, arrangements of parts, and features of construction, all as will be more fully pointed out hereinafter, and disclosed in the accompanying drawings, wherein there is shown a preferred embodiment of this inventive concept.

In the drawings:

Figure 3 is a front elevational view of the device shown in Figures 1 and 2, the position of certain parts being indicated by dotted lines.

Figure 4 is a sectional view taken substantially along the line 4—4 of Figure 2, as viewed in the direction indicated by the arrows, and Figure 5 is a sectional view taken substantially along the line 5—5 of Figure 1.

Like reference numerals refer to like parts throughout the several views of the drawings.

Figure 1:
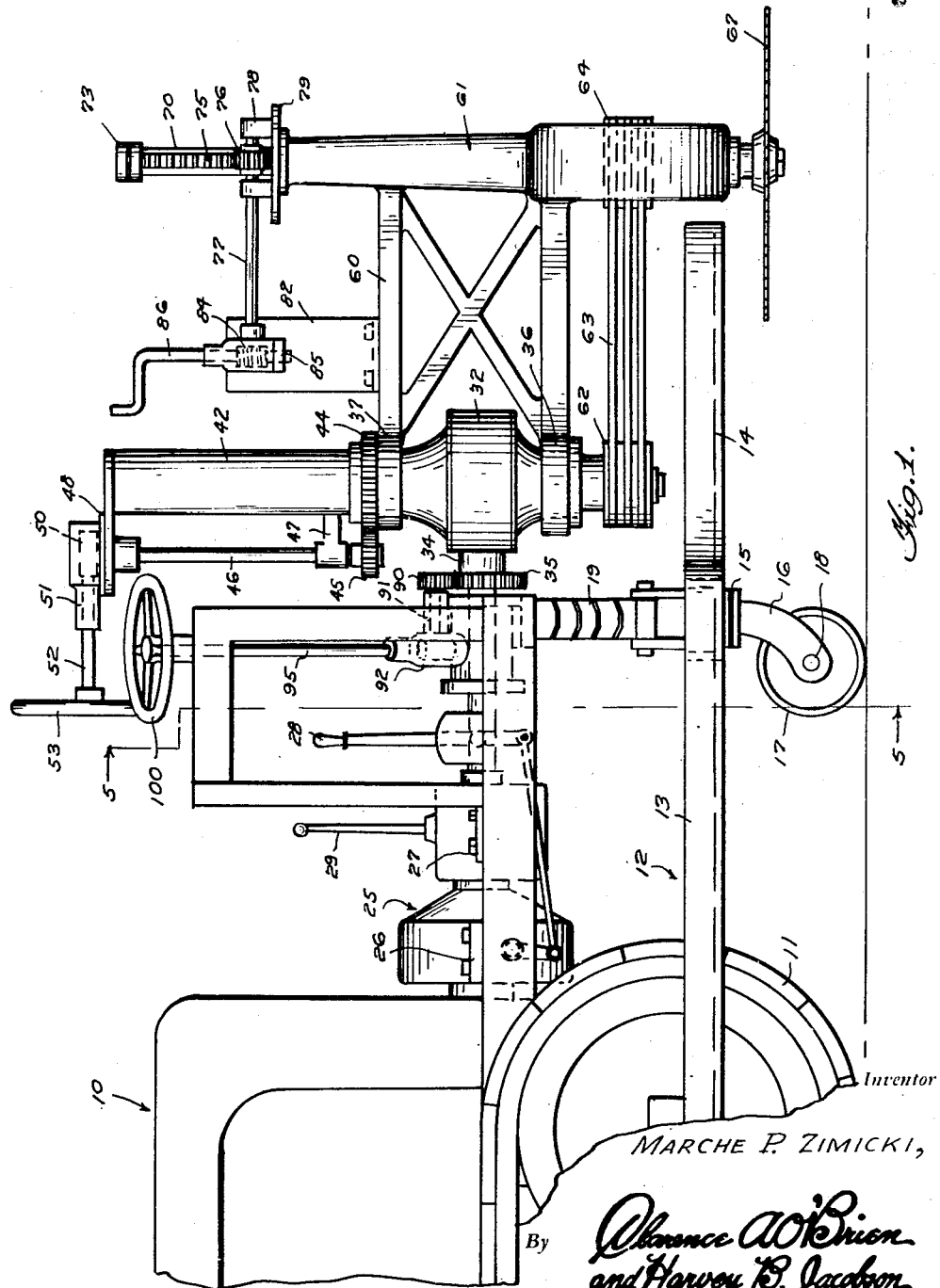
Figure 1 is a side elevational view of one form of apparatus embodying this inventive concept, the position of certain parts being indicated by dotted lines.

Having reference now to the drawings, there is generally indicated at 10 a conventional tractor of any desired type provided with the customary caterpillar treads 11. Secured to tractor 10 in any desired manner, and extending forwardly thereof is a frame generally indicated at 12 and comprised of longitudinally extending members 13 terminating in inwardly tapered portions 14 adapted to form a guard for the operating mechanism. A transverse member 15 extending across members 13 is provided with a bracket 16 in which is mounted a supporting wheel 17 on an axle 18. Transverse member 15 has mounted thereon a leaf-spring 19 upon the upper surface of which rest longitudinally extending frame members 20 connected at their outer extremity as by a transverse portion 21 and secured as by bolts 22 to the body of tractor 10.

A suitable drive shaft extends from the motor of tractor 10 to a transmission generally indicated at 25 supported on transverse members 26 and 27 extending between longitudinally disposed frame members 20, and is provided with a clutch lever 28 and shift lever 29 of conventional construction.

From transmission 25 a drive shaft 30 (Figure 4) extends through a heavy bearing 31 mounted on transverse member 21 outwardly into a housing 32, and terminates in a beveled gear 33. Housing 32 is likewise provided with a relatively heavy bearing 34 through which shaft 30 extends, and which has secured to the outer portion thereof a gear 35, for a purpose to be more fully described hereinafter.

Positioned within housing 32 and mounted for rotation therein is a drive shaft 40 provided at an intermediate point with a beveled gear 41 adapted to be engaged by beveled gear 33. The upper extremity of drive shaft 40 extends into a sleeve 42 and is provided with an enlarged head 43 engaging in a suitable recess in sleeve 42, whereby the parts are held in related assembly. Housing 32 is also provided with a pair of collars 36 and 37 rotatable about the housing. Collar 37 has secured thereto a gear 44 adapted to engage with a gear 45 (Figure 1) carried by a shaft 46 mounted in brackets 47 and 48 extending outwardly from sleeve 42 and fixedly secured thereto. The upper end of shaft 46 carries a gear 49 (Figure 4) adapted to be engaged by a worm gear 50 in a suitable housing 51. Worm gear 50 is secured to a shaft 52 extending out of housing 51 and terminating in a control wheel 53.

From the foregoing it will be seen that rotation of control wheel 53 occasions through the gear chain previously described, the rotation of collars 36 and 37 about housing 32 in a horizontal plane. This rotation, in turn, causes angular displacement of a framework 60 rigidly secured to collars 36 and 37, and carrying at its outer extremity a sleeve 61, thus varying the relative angular position of sleeve 61, and associated mechanism to be described hereinafter, with respect to the front of the tractor 10.

The lower extremity of drive shaft 40 extends outwardly through the bottom of housing 32 and has fixedly secured thereto a pulley 62 from which drive belts 63 extend to a second pulley 64 suitably journaled for rotation in sleeve 61.

Sleeve 61 has a vertical bore therein within which is positioned a drive shaft 65 provided with a longitudinally extending groove 66 adapted to be engaged by splines within pulley 64, the arrangement being such that the shaft 65 is rotated by rotation of pulley 64 but is movable vertically with respect thereto. The lower end of shaft 66 carries a saw blade 67 suitably secured thereto in any desired manner. It will now be seen that the saw blade 67 is adapted to be rotated through the drive shaft 31 extending from the transmission and the motor of the tractor 10.

The upper end of drive shaft 65 extends into a second sleeve 70 slidably movable into and out of a recess 71 cut into the upper extremity of the interior of sleeve 61. Shaft 65 is provided with a reduced extremity 72 and an enlarged head 73, adapted to extend through the upper extremity of sleeve 70 in such manner as to be rotatable therein but movable longitudinally therewith.

Suitably secured to the exterior of sleeve 70 is a rack 75 (Figures 1 and 3) engageable by a gear 76 mounted on a shaft 77 which is supported by two brackets 78 carried by a plate 79 mounted on the top of sleeve 61. The other end of shaft 77 is supported by suitable lugs 80 (Figure 2) carried by a projection 81 formed on a supporting bracket 82 (Figure 1) secured to frame portion 60, and carries a gear 83. Gear 83 is engageable by a worm gear 84 carried by suitable lugs 85 secured to bracket 82, and rotatable as by a crank 86.

It will now be seen that rotation of crank 86 moves the sleeve 70 upwardly and downwardly within sleeve 71, through the gearing arrangement just described, and correspondingly, simultaneously moves drive shaft 65 and saw blade 67. The drive shaft being permitted to move with respect to pulley 64 by means of the spline and groove connection previously described.

Figure 2:
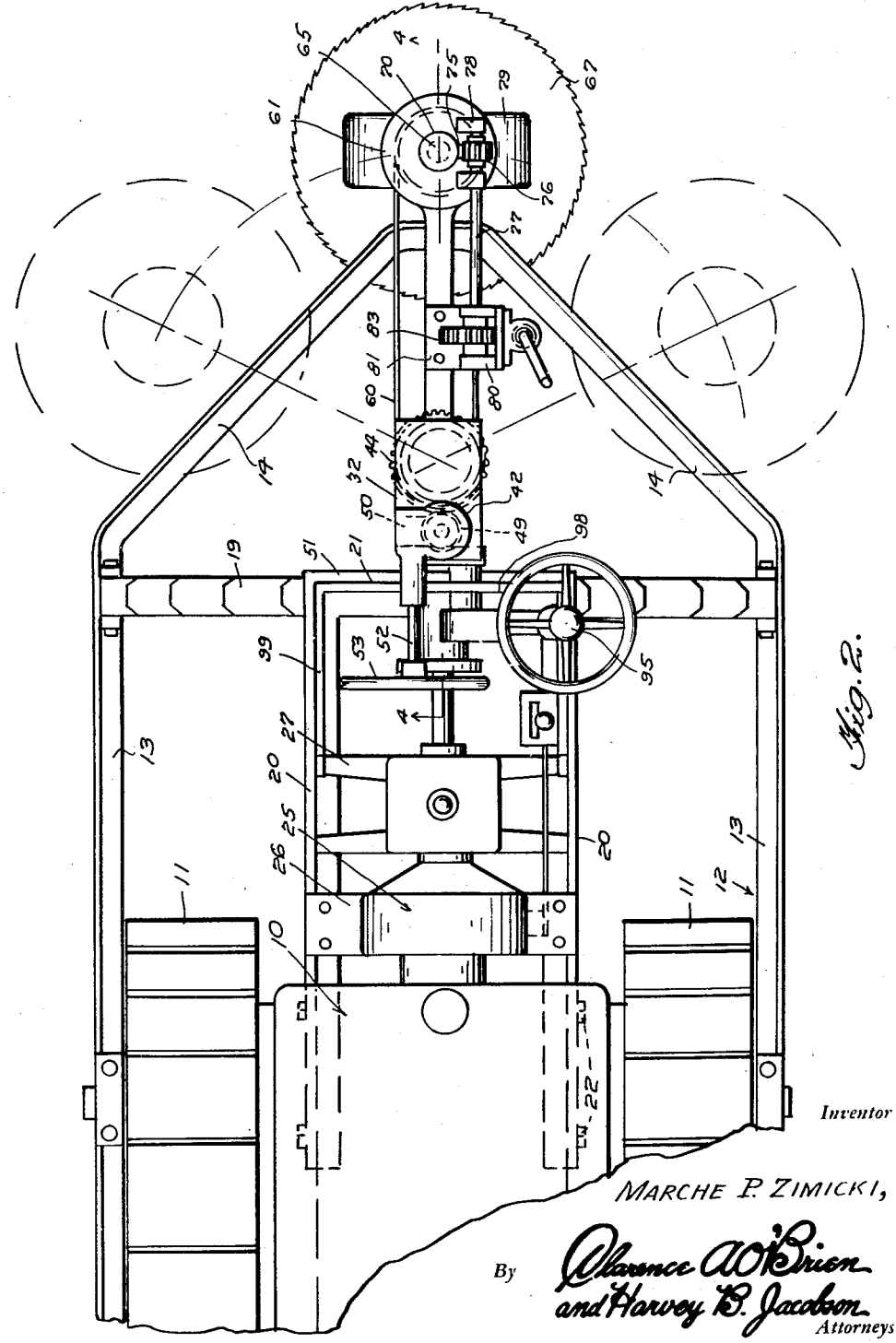
Figure 2 is a top plan view of the device shown in Figure 1, certain alternative positions of the apparatus being indicated by dotted lines.

It will thus be seen that the angular disposition of saw blade 67 can, through the gearing arrangement previously described for the moving of collars 36 and 37 and consequently frame 60 and sleeve 61, be varied with respect to the frame 12 and the front end of tractor 10, alternate positions through this arrangement being indicated by dotted lines in Figure 2. It will also be seen that the relative height of blade 67 can be varied with respect to the ground level, through the rack and gear arrangement operable by handle 86 previously described.

Means are also provided for varying the angular disposition of blade 67 with respect to the ground through an arc ranging from a horizontal position indicated to vertical. Such means take the form of a gear 90 mounted on a stub shaft 91 positioned in a housing 92, gear 90 being positioned in engagement with gear 35. The opposite end of shaft 91 carries a gear 93 (Figure 5) engageable with a worm 94 mounted on a shaft 95. The upper end of shaft 95 is journaled in a bracket 96 secured to a frame comprised of uprights 97 in turn mounted on frame members 20, transverse portions 98 and extending members 99 (Figures 2 and 4) joining the uprights. A control wheel 100 is secured to the upper extremity of rod 95.

From the foregoing it will now be seen that rotation of control wheel 100 occasions, through shaft 93 and gears 90 and 35, rotation of housing 32 about an axis formed along drive shaft 30. It will readily be seen that such rotation occasions, through frame 60, a change in the angular relation of sleeve 61 and correspondingly a change in the angular disposition of blade 67. It will also be seen that such rotation does not effect the relative position of pulleys 62 and 64, since beveled gear 41 is free to revolve in a vertical plane with respect to gear 33, and that consequently the drive mechanism is not affected.

In the operation of the device it will be readily understood that the blade 67 is moved, by tractor 10, to a position adjacent the tree to be felled or other wood to be sawed. If the cut is to be made in a horizontal plane the mechanism is allowed to remain as indicated in the drawings, the hand wheel 53 being adjustable to suitably position the blade 67 adjacent the trunk of a tree, for example, crank 86 is then rotated until the blade 67 is a desired distance from the surface of the ground, whereupon the drive shaft 30 is thrown into engagement with the motor by means of the clutch lever 28 and gear shift lever 29, and the saw operated until the tree is felled.

If, however, it is desired to utilize the device for sawing logs or timber already felled, adjustment of the operating wheel 100 will vary the blade 67 in angular position, until the same is in a vertical position or at a desired intermediate point therebetween, it being noted that the assembly may be rotated through a complete 360° arc, whereupon the wheel 53 may be utilized to obtain a desired height of adjustment above the ground, and the sawing operation performed as previously described.

From the foregoing it will now be seen that there is herein provided a power driven saw, accomplishing all the objects of this invention and others, including many advantages of great practical utility and commercial importance.

As many embodiments may be made of this inventive concept, and as many modifications may be made in the embodiment hereinbefore shown and described, it is to be understood that all matter herein is to be interpreted as merely illustrative and not in a limiting sense.

I claim:

In a device of the character described, a source of power, a drive shaft extending therefrom, a housing mounted and pivoted on said shaft, a second drive shaft in said housing geared to said first-mentioned drive shaft, a bracket secured to said housing, a rod journaled in said bracket, means for rotating said rod, gear means secured to said rod and a gear fixed to said housing enmeshed with said last mentioned gear means, whereby rotation of said housing may be effected upon rotation of said rod, a sleeve secured to said housing, a drive shaft in said sleeve, a saw mounted on said last-mentioned drive shaft, means for driving said last-mentioned shaft from said second-mentioned shaft, and means for varying the longitudinal position of said last-mentioned shaft in said sleeve, said means including a second sleeve mounted for movement within said first-mentioned sleeve, a rack on said second-mentioned sleeve, and gearing associated with said rack, and an operating handle to move said gearing and hence said second-mentioned sleeve.

MARCHE P. ZIMICKI.

REFERENCES CITED

The following references are of record in the file of this patent:

UNITED STATES PATENTS

| Number | Name | Date |
|---|---|---|
| 827,548 | Martin | July 31, 1906 |
| 1,039,338 | Wallace | Sept. 24, 1912 |
| 1,067,076 | Tapp | July 8, 1913 |
| 1,126,312 | Strauss | Jan. 26, 1915 |
| 1,182,976 | Conner et al. | May 16, 1916 |
| 1,318,324 | Keon | Oct. 7, 1919 |
| 1,602,357 | Georgelis | Oct. 5, 1926 |
| 1,696,527 | Crumby | Dec. 25, 1928 |
| 1,798,402 | Dibble | Mar. 31, 1931 |
| 2,354,095 | Adams | July 18, 1944 |